J. Fales,
Floor Gage.
No. 94,814.
Patented Sep. 14, 1869.
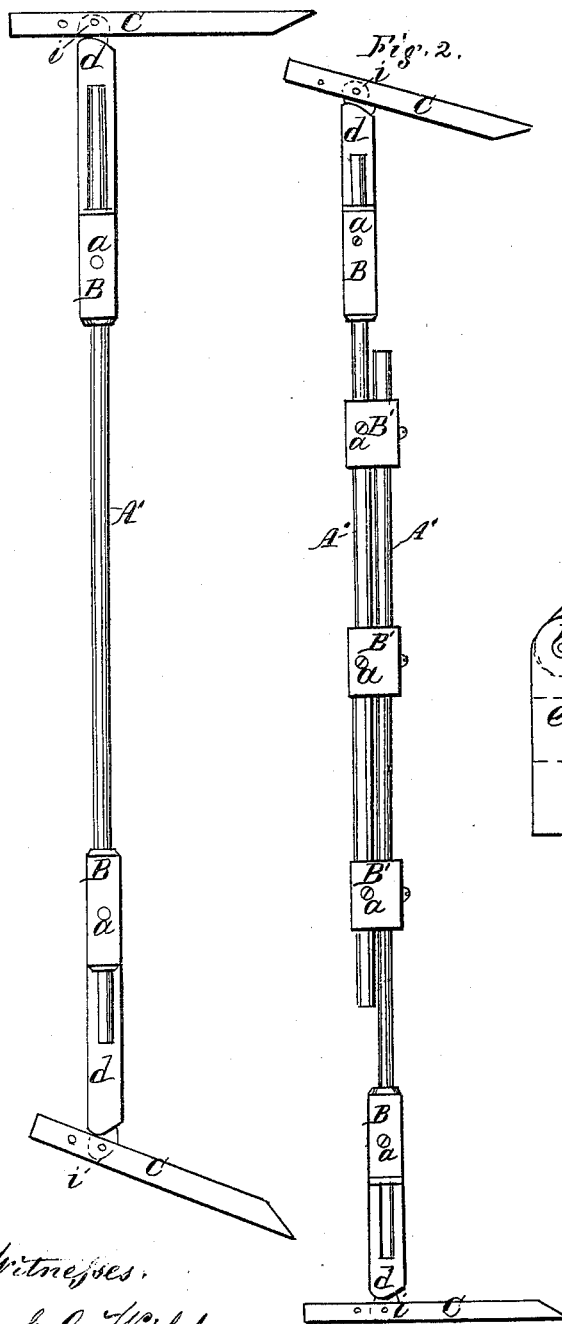
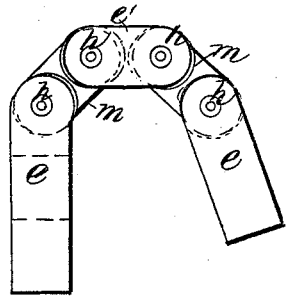

United States Patent Office.

JOEL FALES, OF CAMBRIDGE, MASSACHUSETTS.

Letters Patent No. 94,814, dated September 14, 1869.

IMPROVEMENT IN FLOOR-GAUGE.

The Schedule referred to in these Letters Patent and making part of the same.

*To all whom it may concern:*

Be it known that I, JOEL FALES, of Cambridge, county of Middlesex, and State of Massachusetts, have invented an Improved Floor-Gauge; and do hereby declare the following to be a full, clear, and exact description thereof, reference being had to the accompanying drawings, in which—

Figure 1 represents gauge with single rod.

Figure 2 represents gauge with double rod.

Figure 3 represents an attachment for measuring curves.

The object of my invention is to produce a gauge by which floor-boards may be measured for cutting to the exact dimensions and angles required, without the slow process of measuring by rule and shaping by square; and my invention has been suggested to me by the inconveniences experienced in laying floors and the time lost in measuring.

The nature of my invention consists in an adjustable rod or rods, with movable try-gauges at each end, which readily adapt themselves to the angle of the floor, while the length of the board is taken a once.

In the drawings—

A and A' are rods of suitable size and length.

B B are slides or shoulders, into which the rods run, these rods being held in the slides by set-screws $a\ a$.

B' B' are additional slides or supports, used when more than one rod is employed. These slides B B serve to steady the gauge and preserve its straightness.

$c\ c$ are movable try-gauges, hung upon the pin $d$, at $i$, and are held in any desired relation to the rods, by moving in a tight joint or by a set-screw.

The gauge may be adjusted to any length, by running the rods in the pieces B' B', as desired. A single rod is sufficient in ordinary rooms, but two or more rods may be employed, as shown, when greater length or stability of gauge is required.

The operation or use of my gauge is as follows:

Lay the gauge upon the floor, where a board is to be put down, pushing the try-gauges $c\ c$ flush up to the walls at each side, and set the screws $a\ a$. This secures the exact length of board required, while the pieces $c\ c$ determine at once the angle of the ends of the boards. All that is necessary then is to lay the gauge upon the board to be cut, and mark accordingly, thus obtaining quickly the precise dimensions desired.

A great amount of time is saved by this simple invention.

When laying boards where one or both sides of the room are curved in either direction, I attach the try-gauge shown in fig. 3, in place of gauge $c$. This try-gauge, for curved places, is constructed of pieces $e\ e$ and $m\ m$, attached and turning on pins $h\ h$.

What I claim as my invention, and desire to secure by Letters Patent, is—

1. A floor-gauge, composed of pieces $d\ d$, having shoulders or clasps B B, rod A, and try-gauges $c\ c$, or substitute shown in fig. 3, and set-screws $a\ a$, all constructed, arranged, and operating substantially as described and set forth.

2. The combination of rods A' A', pieces $d\ d$, having shoulders or clasps B, supports B' B', set-screws $a\ a$, and try-gauges $c\ c$, or substitute shown in fig. 3, the whole making a floor-gauge, constructed, arranged, and operating substantially as shown and described, as and for the purposes set forth.

In testimony whereof, I have signed my name to this specification, in the presence of two subscribing witnesses.

JOEL FALES.

Witnesses:
CARROLL D. WRIGHT,
AUSTIN S. HOWARTH.